US008743732B2

(12) United States Patent
Guo

(10) Patent No.: US 8,743,732 B2
(45) Date of Patent: Jun. 3, 2014

(54) UPDATING METHOD AND DEVICE FOR IU INTERFACE PARALLEL MULTIMEDIA BROADCAST MULTICAST SERVICE SESSION

(75) Inventor: Longping Guo, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 766 days.

(21) Appl. No.: 12/598,375

(22) PCT Filed: Aug. 14, 2007

(86) PCT No.: PCT/CN2007/002443
§ 371 (c)(1),
(2), (4) Date: Apr. 22, 2010

(87) PCT Pub. No.: WO2008/131612
PCT Pub. Date: Nov. 6, 2008

(65) Prior Publication Data
US 2010/0208641 A1 Aug. 19, 2010

(30) Foreign Application Priority Data
Apr. 30, 2007 (CN) .......................... 2007 1 0107172

(51) Int. Cl.
H04L 12/28 (2006.01)
(52) U.S. Cl.
USPC ........................................................ 370/254

(58) Field of Classification Search
None
See application file for complete search history.

(56) References Cited

U.S. PATENT DOCUMENTS

2006/0023664 A1* 2/2006 Jeong et al. .................... 370/329
2007/0232308 A1* 10/2007 Bergstrom et al. ........... 455/436
2009/0310525 A1* 12/2009 Breuer et al. ................. 370/312
2010/0067405 A1* 3/2010 Kanazawa et al. ............ 370/254

FOREIGN PATENT DOCUMENTS

CN 1758644 A 4/2006
CN 1268089 C 8/2006

OTHER PUBLICATIONS

P.R. China, State Intellectual Property Office, International Search Report for International Application No. PCT/CN2007/002443, mailed Feb. 28, 2008.

* cited by examiner

Primary Examiner — Raj Jain
(74) Attorney, Agent, or Firm — Bright IP Law Offices

(57) ABSTRACT

An updating method and device for an Iu interface supported parallel Multimedia Broadcast Multicast Service session are provided. The method includes: step 1, receiving the MBMS session updating message of the SGSN by the RNC; step 2, detecting whether the modified MBMS SA of the MBMS session and the MBMS SA of other sessions of the same service overlaps with each other or not; and step 3, performing the updating operation for the Multimedia Broadcast Multicast service session according to the detecting result.

6 Claims, 5 Drawing Sheets

UPDATING METHOD AND DEVICE FOR IU INTERFACE PARALLEL MULTIMEDIA BROADCAST MULTICAST SERVICE SESSION

FIELD OF THE INVENTION

The present invention relates to mobile communication field, in particular to an updating method and device for an Iu interface supported parallel Multimedia Broadcast Multicast Service session used in Code Division Multiple Access system.

BACKGROUND OF THE INVENTION

In order to make use of mobile network resource effectively, MBMS (Multimedia Broadcast Multicast Service) is proposed by the Third Generation Partnership Project (3GPP), that is, a data source is provided in the mobile network for transmitting data to multiple users which is called Point-to-multipoint service, so that the network resource sharing is realized, and the utilization rate of the network resource is improved, especially the precious air interface resources. MBMS can not only realize the message multicast and broadcast of plain text with low speed, but also realize the multicast and broadcast of multimedia service with high speed. Various and plentiful video, audio, and multimedia services can be provided, which undoubtedly conforms to the development trend of the future mobile data and provides a better service prospect for the development of the mobile communication.

FIG. 1 is a structural model drawing of MBMS service system. As shown in FIG. 1, the Broadcast-Multicast Service Center (BM-SC) is a newly added mobile network functional entity, which is the entrance of the content provider, and is used for authorizing and initiating MBMS bearer service in mobile network, and planning for transmitting MBMS content based on the scheduled time.

For the existing WCDMA packet network functional entity: a General Packet Radio Service Gateway Support Node (GGSN), a Serving General Packet Radio Service Support Node (SGSN), a Radio Access Net (RAN) and User Equipment (UE), the MBMS related functions and processes are also needed to be added.

MBMS is divided into Broadcast Service and Multicast Service. The transmitting of MBMS service is limited to a certain range, namely, the transmitting of each MBMS service is restricted to a certain area, and the area is known as the service area corresponding to MBMS service. Based on 3GPP protocol, the transmitting area of the broadcast service is defined as Broadcast service area of the broadcast service, and the transmitting area of the multicast service is defined as Multicast service area. Considering the regional characteristics of some MBMS services, such as weather forecast, road traffic information and so on, the transmitting content is related to the area in which UE is located. When UE is located in a specific area of MBMS SA, only the contents related to the area are needed to be received, through which a requirement that different service contents are transmitted in different areas for the same MBMS service is educed. Therefore, Local Broadcast Area and Local Multicast Area are separately defined for broadcast service and multicast service by 3GPP.

FIG. 2 is a relationship diagram of MBMS SA and local service area of the prior art. As shown in FIG. 2. Each MBMS broadcast service has a broadcast service area, and the broadcast service area includes one or a plurality of local broadcast areas. The service contents related to the local area are only transmitted in local broadcast area, and the transmitting service contents are different in different local broadcast areas. Each MBMS multicast service has a multicast service area, and the multicast service area includes one or a plurality of local multicast areas. The service contents related to the local area are only transmitted in local multicast area, and the transmitting service contents are different in different local multicast areas.

MBMS service date is transmitted via MBMS bearer, and MBMS bearer is managed via MBMS session. One MBMS session is corresponding to one MBMS bearer, and each MBMS session is corresponding to a MBMS Service Area (MBMS SA). MBMS SA is composed of one or a plurality of MBMS Service Area Identity (MBMS SA ID). Each MBMS SA ID is corresponding to one or a plurality of subzones in RNC (Radio Network Controller). When MBMS session begins, MBMS SA is passed through GGSN via BM-SC and transmitted to RNC via SGSN, after RNC receives MBMS session beginning request, MBMS service is only provided in the cell within MBMS SA.

If a MBMS SA is divided into a plurality of local areas, MBMS bearers for bearing service data are required to be different as the service contents transmitted by different areas are different. Therefore, each local area is separately established a MBMS session by BM-SC, namely, a plurality of parallel MBMS sessions is initiated. The parallel MBMS sessions use the same TMGI (Temporary Mobile Group Identity), which should be marked that the sessions belong to the same MBMS service. As the MBMS service contents transmitted on the same local area are the same, the corresponding MBMS SA is different for the parallel MBMS session of the same MBMS service in the different local area. In other words, the cells included in MBMS SA which is corresponding to the MBMS sessions in different local areas of the same MBMS service can not be overlapped with each other; otherwise, UE may receive service contents from multiple local areas in the overlapped cells.

FIG. 3 is the beginning process flowchart of Iu interface MBMS session of the prior 3GPP. As show in FIG. 3, the following steps are included:

S302, "a MBMS session starts" message is transmitted to the RNC by means of SGSN to request the RNC to notice the start of UE MBMS session on the corresponding MBMS service area, and the MBMS SA is included in the message;

S304, The RNC receives the message "a MBMS session starts" and detects whether there are other sessions established of the same MBMS service in the RNC and the SGSN;

S306, if the overlap of the MBMS SA which is corresponding to other sessions established and the MBMS SA brought by the new message sent by the SGSN exist, the MBMS SA of the message is deemed to be illegal, and return the message "the MBMS session start fails" to the SGSN;

S308, if other sessions established on the same MBMS service exist, or the MBMS SA which is corresponding to other sessions and the MBMS SA brought by the new message sent by the SGSN don't overlap. The message can be processed normally. The message that the MBMS session start to response or the message that the start of the MBMS session is failed will be returned to SGSN according to the processing result.

Wherein, the demand for modifying MBMS SA is also introduced in the R7 edition of 3GPP for MBMS broadcast service, namely, in the process of MBMS session, BM-SC can modify the service area of MBMS broadcast service.

FIG. 4 is an updating process flowchart of Iu interface MBMS session of the 3GPP in the prior art. As shown in FIG. 4, the following steps are included:

S402, "a MBMS session updating" message is transmitted to RNC by means of SGSN to notice that the service area corresponding to MBMS broadcast service is modified, and the modified MBMS SA is included in the message;

S404, The RNC receives the message "a MBMS session updating" and does not detect whether the modified MBMS SA and the MBMS service of other sessions of the same service overlaps with each other, and the MBMS session updating request should be processed normally, namely, the cell included in the unmodified MBMS SA and the modified MBMS SA should be compared;

S406, The MBMS bearer is established in the cell which is not included in the unmodified service area but is included in the modified service area (S406a), the MBMS bearer is deleted in the cell which is included in the unmodified service area but is not included in the modified service area (S406b), and the MBMS bearer will not be affected in the cell which is included both in the unmodified service area and the modified service area (S406c).

In the prior art, under the condition that a MBMS service is corresponding to a plurality of local areas, when RNC receives the MBMS session updating of the parallel session of the same MBMS service, the overlap of the cells with different sessions included in MBMS SA is not detected, which can lead that the same cell under RNC belongs to a plurality of local areas of the same MBMS service after MBMS session is updated. UE under the overlapped cell can receive the same MBMS service and a plurality set of service contents from different areas, which violates the unmodified intention of MBMS service local area defined by 3GPP.

Therefore, an updating method and device for an Iu interface supported parallel Multimedia Broadcast Multicast Service session is urgently desired to solve the problems existed in the protocol of the prior art.

SUMMARY OF THE PRESENT INVENTION

The technical problem solved by the present invention is to provide an updating method and device for an Iu interface supported parallel Multimedia Broadcast Multicast Service session to solve the problem that UE under the overlapped cell receives the same MBMS service and a plurality set of service contents from different areas.

In order to solve the technical problem, one aspect of the present invention provides an updating method and device for an Iu interface supported parallel Multimedia Broadcast Multicast Service session, which includes: after receiving MBMS session updating message of SGSN, detecting whether the modified MBMS SA of the MBMS session and MBMS SA of other sessions of the same service overlaps with each other and performing the updating operation for the MBMS service session according to the detecting result by means of RNC.

Wherein, the modified MBMS SA is carried in MBMS session updating message.

The detecting whether the modified MBMS SA and the MBMS SA of other sessions of the same service overlaps or not is completed by the following processes: determining whether other sessions established of the same MBMS service exist on the RNC; and determining whether MBMS SA corresponding to said other sessions established and the modified MBMS SA have at least one cell of the same or not in the case that said other sessions established exist.

When the determining result is that there is at least one cell of the same, the modified MBMS SA in MBMS session updating message shall be determined as illegal by RNC, the message that the updating of MBMS session is failed will be returned to SGSN.

In addition, determining that the modified MBMS SA in the MBMS service session updating message is legal and performing the MBMS service session updating request in the case that the determining result of the first determination unit is that there isn't said other sessions established of the same MBMS or there isn't at least one cell of the same on the RNC.

The present invention also provides an updating device for an Iu interface supported parallel MBMS service session, which comprises A detecting unit, for detecting whether the modified MBMS Service area (MBMS SA) of the MBMS Service session and the MBMS SA of other sessions of the same service overlaps with each other or not and performing the updating operation for the MBMS Service session according to the detecting result after the MBMS Service session updating message of SGSN is received.

Wherein, the modified MBMS SA is carried in the MBMS session updating massage.

The detecting unit comprises a first determination unit, for determining whether other sessions established of the same MBMS exist on RNC; and a second determining unit, for determining whether MBMS SA corresponding to said other sessions established and the modified MBMS SA have at least one cell of the same or not in the case that said other sessions established exist, judging by the first determination unit.

In addition, the updating device also comprises a returning unit, for returning the failure message of the MBMS session updating under the condition that the detecting result of the second determination unit is that at least one same cell exists, and a processing unit, for determining that the modified MBMS SA in the MBMS session updating message is legal under the condition that the detecting result of the first determination unit is that other sessions of the same MBMS service are not existed or the detecting result of the second determination unit is that at least one same cell is not existed, and performing the MBMS session updating request according to the prior protocol.

Therefore, the problems existing in the prior protocol can be solved by the present invention, and the session updating of Iu interface supported parallel MBMS service can be processed in CDMA system.

Other characteristics and advantages of the present invention will be described in the following specification, and part of the characteristics and advantages can be obviously seen form the specification or can be known by implementing the present invention. The objectives and other advantages of the present invention can be achieved and obtain via the specification, claims and the specific structures in drawings.

BRIEF DESCRIPTION OF THE DRAWINGS

The drawings in the specification provide a further understanding to the present invention and constitute a part of the application. The exemplary embodiments of the present invention and the explanation thereof are given thereafter by way of illustration only, and thus are not limitative of the present invention, and wherein.

DETAILED DESCRIPTION

The embodiments of the present invention will be detailed hereinafter and reference will be made to the drawings. The embodiments described here are only used for explaining the present invention, and are not used for limiting the present invention.

Figure 5:
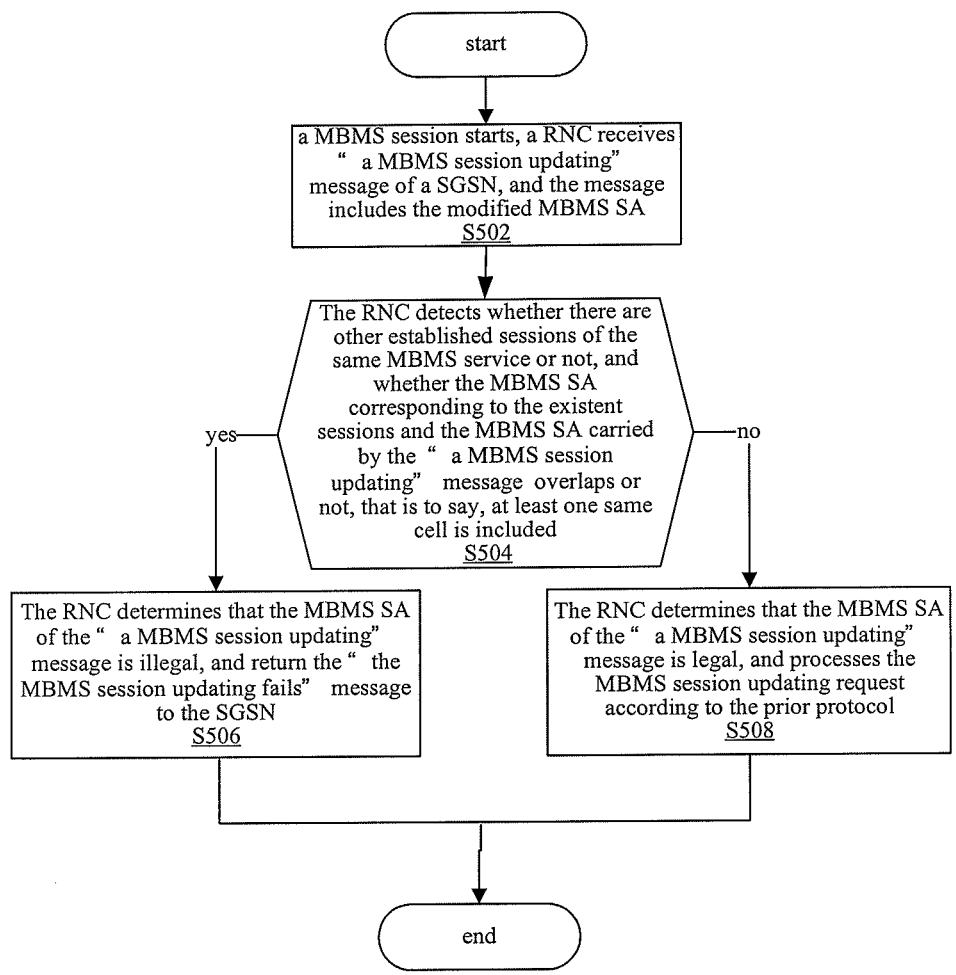
FIG. 5 is an updating process flowchart of Iu interface MBMS session of the present invention according to the embodiment of the present invention.

FIG. 5 is an updating process flowchart of Iu interface MBMS session of the present invention. The method comprises the following steps: After receiving the MBMS session updating message of the Serving General Packet Radio Service Support Node (SGSN), detecting whether the modified MBMS Service area (MBMS SA) of the MBMS service session and the MBMS SA of other sessions of the same service overlaps with each other or not, and performing the corresponding operation according to the detecting result by means of RNC.

Wherein, the modified MBMS SA is carried in the MBMS session updating massage.

The operation of detecting whether the modified MBMS SA and the MBMS SA of other sessions of the same service overlaps or not is completed by the following processes: determining whether other sessions established of the same MBMS exist on the RNC; and determining whether MBMS SA corresponding to said other sessions established and the modified MBMS SA have at least one cell of the same or not in the case that said other sessions established exist.

When the determining result is that there is at least one cell of the same, the modified MBMS SA in MBMS session updating message shall be determined as illegal by RNC, the message that the updating of MBMS session is failed will be returned to SGSN.

In addition, determining that the modified MBMS SA in the MBMS service session updating message is legal and performing the MBMS service session updating request according to the prior protocol in the case that the determining result of the first determination unit is that there isn't said other sessions established of the same MBMS or there isn't at least one cell of the same on the RNC.

Figure 1:
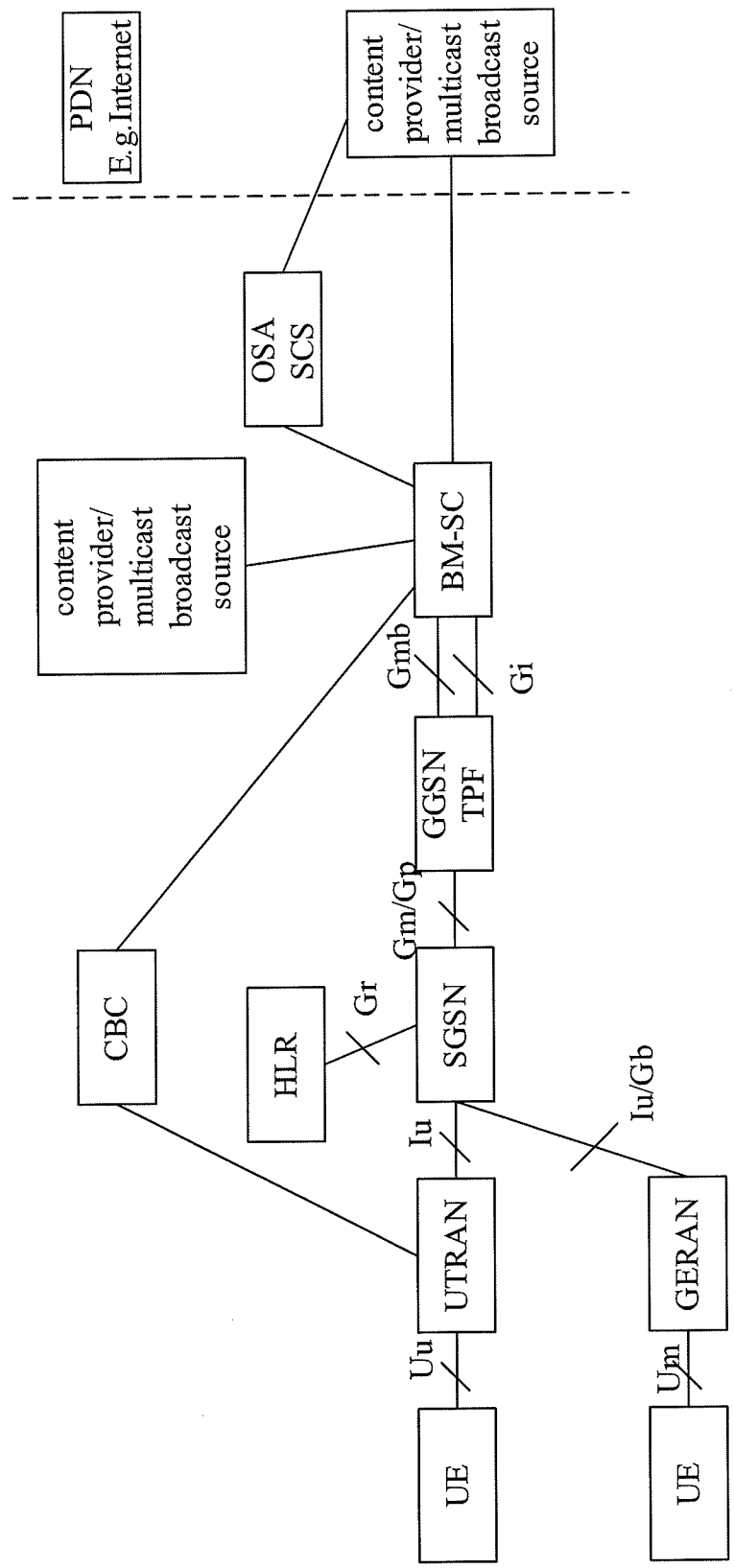
FIG. 1 is a structural model drawing of MBMS service system of the prior art.
Figure 2:
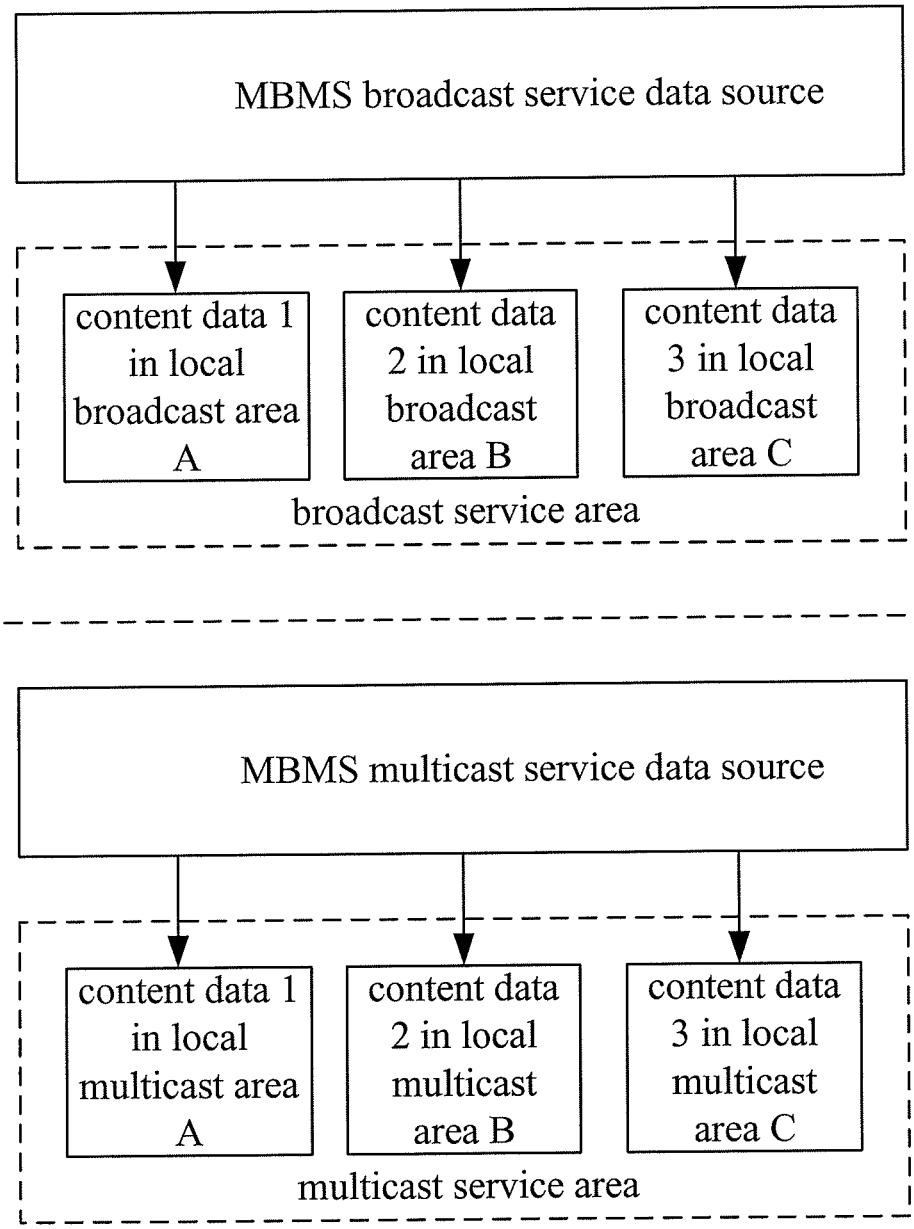
FIG. 2 is a relationship diagram of MBMS SA and local service area.
Figure 3:
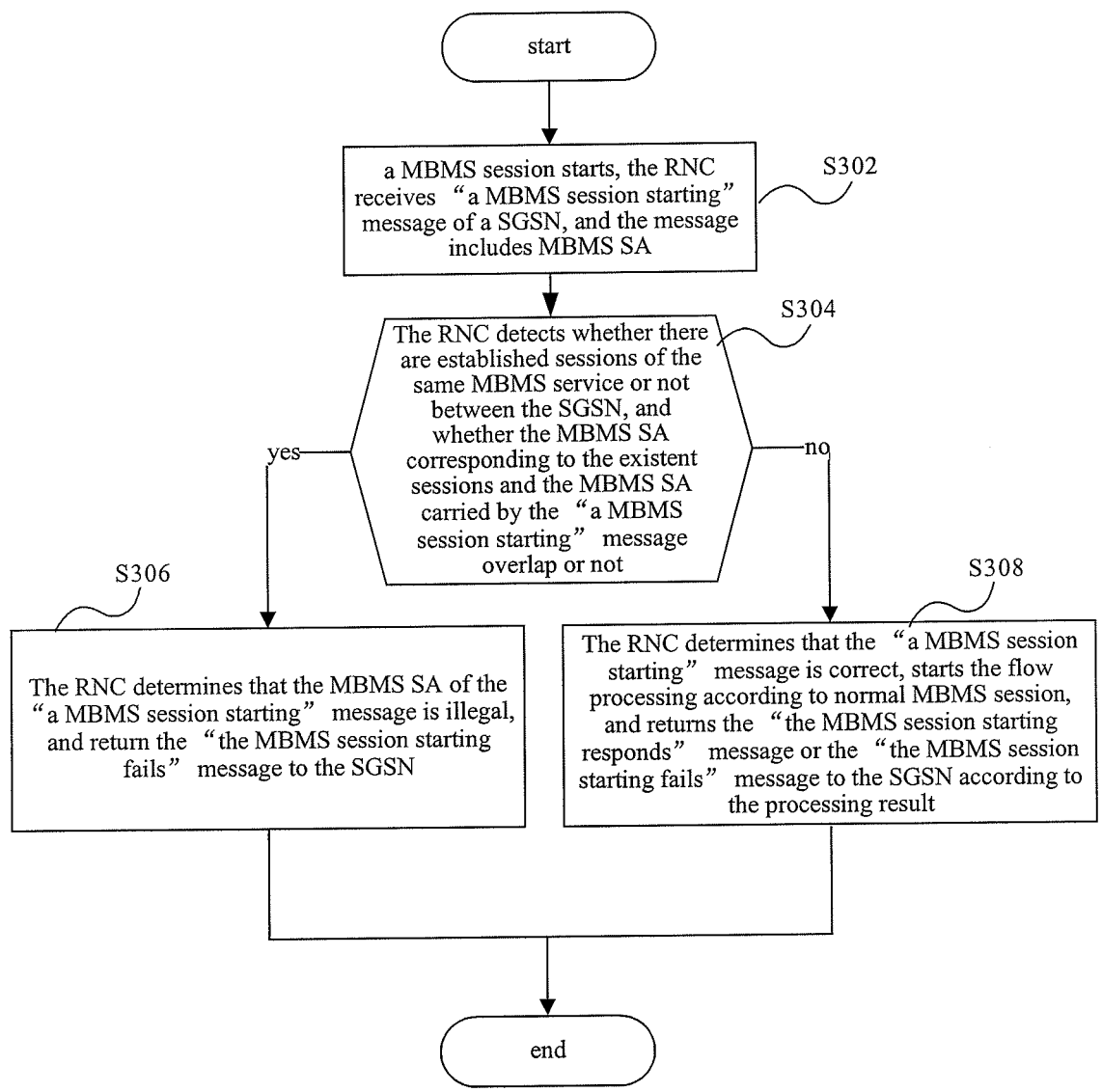
FIG. 3 is a beginning process flowchart of Iu interface MBMS session of the prior art.
Figure 4:
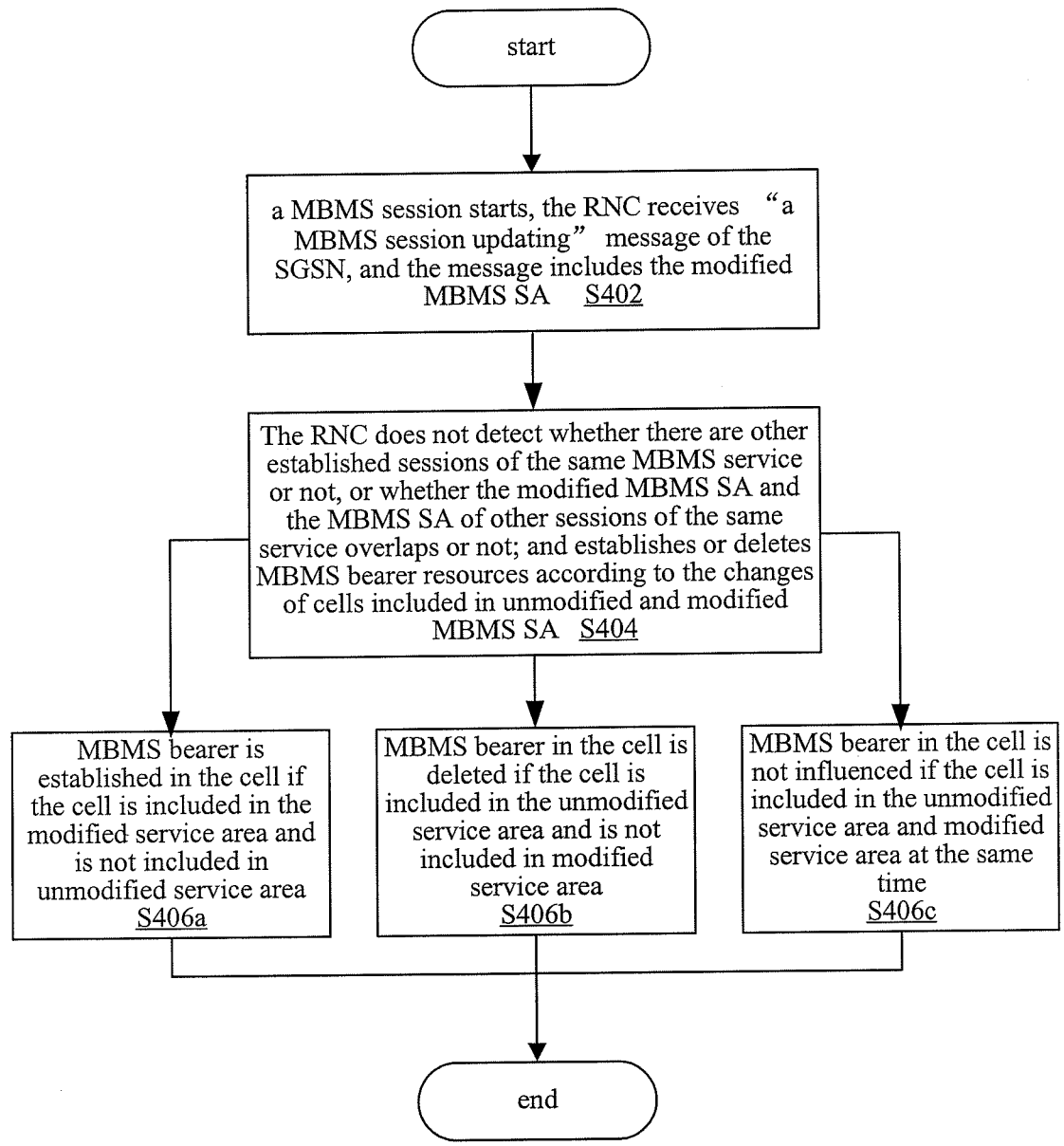
FIG. 4 is an updating process flowchart of Iu interface MBMS session of the prior art.

The following is the detailed description for the session updating process of the present invention which combines FIG. 2 and FIG. 5.

As shown in FIG. 2, some MBMS broadcast service is used for transmitting the information of national traffic conditions and the scope of the broadcast service area of the service is the whole nation. According to the regional characteristics of the service contents, the broadcast service area of the service is divided into three local broadcast areas A, B and C based on geographic area, wherein the included cells do not overlap with each other. Each local broadcast separately transmits the traffic condition information of the corresponding local broadcast area, namely, UE in the local broadcast A, B and C may receive different traffic condition information. When the session of the MBMS broadcast service begins, BM-SC separately generates the MBMS session beginning of the service to the local broadcast areas A, B and C. RNC on the boundary of the local broadcast areas of A, B and C includes a cell which is corresponding to the three local broadcast areas at the same time, correspondingly, for the local broadcast areas A, B and C, RNC separately establishes a MBMS session A, a MBMS session B and a MBMS session C. The cells included in the three MBMS session service areas are totally different. UE in the cell of the local broadcast area A can only receive the service content 1, in the cell of the local broadcast area B can only receive the service content 2 and in the cell of the local broadcast area C can only receive the service content 3.

In the processing of the service, the division of the local broadcast areas of the service should be adjusted by BM-SC according to the requirement, MBMS SA which is corresponding to area A is varied. Therefore, the RNC is notified via BM-SC by using the intermediate service nodes of GGSN and SGSN in the MBMS session updating flow. As shown in FIG. 5, the following steps are included:

S502, SGSN transmit a "a MBMS session updating" message of the MBMS session A to the RNC, wherein, the modified MBMS SA on the local broadcast area A of the MBMS broadcast service is carried.

S504, after the RNC receiving the MBMS session updating message, other sessions of B and C of the same MBMS service exist on RNC should be firstly detected, and whether the MBMS SA of the modified local broadcast area A in the MBMS session updating area and the MBMS SA of session B and session C of the service overlaps or not should be detected, namely, whether the MBMS SA of the local broadcast area A, B or C includes at least one cell of the same. If at least one cell exists, S506 should be carried out; otherwise, S508 should be carried out.

S506, The RNC determines that the MBMS SA in the "a MBMS session updating" message is illegal, and return the "the MBMS session updating fails" message back to SGSN.

S508, The RNC determines that the modified MBMS SA of the "a MBMS session updating" message is legal, and processes the MBMS session updating request according to the prior protocol, namely, comparing the cells included in the unmodified MBMS SA and the modified MBMS SA of the session A of the MBMS broadcast service, MBMS bearer in the cell which is existed in the modified MBMS SA but not existed in the unmodified MBMS SA should be established, and MBMS bearer in the cell which is not existed in the modified MBMS SA but existed in the unmodified MBMS SA should be deleted, and at the same time, the MBMS bearer in the cell which is existed in both the unmodified MBMS SA and the modified MBMS SA is not affected.

Figure 6:
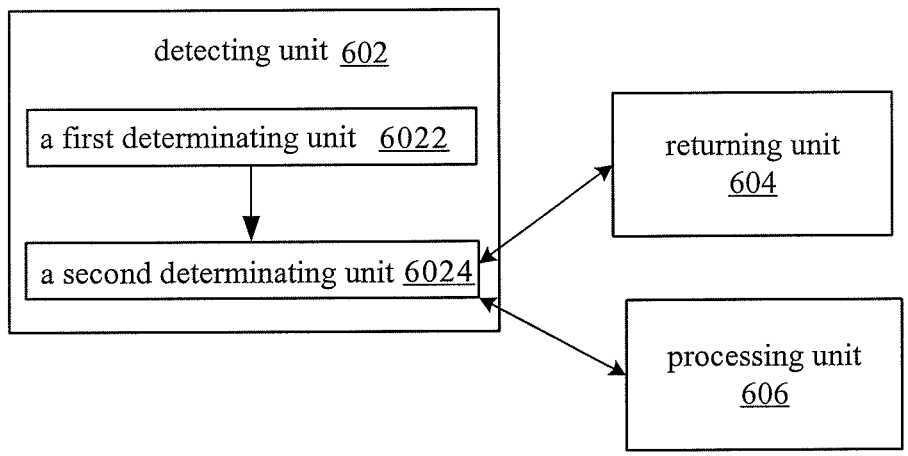
FIG. 6 is the block diagram of the updating device for the Iu interface supported parallel MBMS service session of the present invention according to the embodiment of the present invention.

FIG. 6 is the block diagram of the updating device for the Iu interface supported parallel Multimedia Broadcast Multicast Service session of the present invention. As shown in FIG. 6, the device comprises a detecting unit 602, for detecting whether the modified MBMS SA of the MBMS session and the MBMS SA of other sessions of the same service overlaps or not after the MBMS session updating message of SGSN is received, and performing the corresponding operation according to the detecting result.

Wherein, the modified MBMS SA is carried in the MBMS session updating massage.

The detecting unit 602 comprises a first determining unit 6022, for determining whether other sessions of the same MBMS service which have been established exists on RNC; a second determining unit 6024, for determining whether MBMS SA corresponding to said other sessions established and the modified MBMS SA have at least one cell of the same or not in the case that said other sessions established exist, judging by the first determination unit 6022.

In addition, the updating device also comprises a returning unit 604, for returning the failure message of the MBMS session updating in the case that the determining result from the second determination unit 6024 is that there is at least one cell of the same, and a processing unit 606, for determining that the modified MBMS SA in the MBMS session updating message is legal and performing the MBMS session updating request according to the prior protocol in the case the determining result of the first determination unit 6022 is that there isn't said other sessions established of the same MBMS service or there isn't at least one cell of the same.

To sum up, the problems existing in the prior protocol can be solved by the present invention, and the session updating of Iu interface supported parallel MBMS service can be processed in CDMA system.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all concluded in the scope of protection of the present invention.

What is claimed is:

1. An updating method for an Iu interface supported parallel Multimedia Broadcast Multicast Service (MBMS) session, comprising:
   a Radio Network Controller (RNC), after receiving a MBMS session updating message from a Serving General Packet Radio Service Support Node (SGSN), detecting whether a modified MBMS Service area (MBMS SA) of the MBMS service session overlaps with MBMS SAs of other sessions of the same MBMS service, and performing an updating operation for the MBMS service session according to the detecting result, wherein the modified MBMS SA is carried in the MBMS service session updating message, further wherein the step of detecting whether the modified MBMS SA overlaps with the MBMS SAs of the other sessions of the same MBMS service is completed by the following processes:
   determining whether there is another established session of the same MBMS service existing on the RNC; and
   determining whether an MBMS SA corresponding to said another established session has at least one cell shared with the modified MBMS SA if said another established session exists.

2. The updating method according to claim 1, wherein, when the determining result is that there is at least one shared cell, the SGSN returns an MBMS service session updating failure message.

3. The updating method according to claim 1, wherein, the RNC determining that the modified MBMS SA in the MBMS service session updating message is legal and processing a request carried in the MBMS session updating message when the determining result is that there isn't said another established session of the same MBMS service existing on the RNC or there is no at least one shared cell.

4. An updating device for an Iu interface supported parallel Multimedia Broadcast Multicast Service (MBMS) session, comprising:
   a detecting unit, used for detecting whether a modified MBMS Service area (MBMS SA) of a MBMS Service session overlaps with MBMS SAs of other sessions of the same MBMS service after receiving an MBMS Service session updating message from a Serving General Packet Radio Service Support Node (SGSN), and performing an updating operation for the MBMS Service session according to the detecting result, wherein the modified MBMS SA is carried in the MBMS Service session updating message, further wherein the detecting unit comprises:
   a first determining unit, used for determining whether there is another established session of the same MBMS service existing on a Radio Network Controller (RNC); and
   a second determining unit, used for determining whether an MBMS SA corresponding to said another established session has at least one cell shared with the modified MBMS SA if the first determination unit determines that said another established session exists.

5. The updating device according to claim 4, wherein, further comprising:
   a returning unit, used for returning an MBMS service session updating failure message if the determining result of the second determination unit is that there is at least one shared cell.

6. The updating device according to claim 4, wherein, further comprising:
   a processing unit, used for determining that the modified MBMS SA in the MBMS service session updating message is legal and processing a request carried in the MBMS service session updating message if the determining result of the first determination unit is that there is no said another established session of the same MBMS service existing or there is no at least one shared cell.

* * * * *